United States Patent [19]
Otto

[11] 3,712,429
[45] Jan. 23, 1973

[54] CYLINDER AND PISTON ARRANGEMENT
[75] Inventor: Günter Otto, Altbach, Germany
[73] Assignee: Suspa Federingstechnik GmbH, Nurnberg, Germany
[22] Filed: March 12, 1971
[21] Appl. No.: 123,767

[30] Foreign Application Priority Data

March 19, 1970 Germany ................... G 70 10 209.9

[52] U.S. Cl. .............................. 188/300, 137/614.11
[51] Int. Cl. ................................................. F16f 9/34
[58] Field of Search ......... 137/614.11, 614.19, 614.2; 251/359, DIG. 72; 188/300

[56] References Cited

UNITED STATES PATENTS 1,331,720  2/1920  Paterson ........................ 137/DIG. 1

3,563,349  2/1971  Spieth ......................... 137/614.11 X

Primary Examiner—Edgar W. Geoghegan
Assistant Examiner—Irwin C. Cohen
Attorney—Stevens, Davis, Miller & Mosher

[57] ABSTRACT

A piston and cylinder arrangement, more particularly for the stepless adjustment of table flaps, chair backs etc., comprises a cylinder containing a pressure medium, more particularly a gas under pressure. In the cylinder a piston rod with a piston fixed to it is arranged to slide. The piston is provided with an annular seal bearing against the cylinder bore and is bypassed by means of a connecting duct in the piston. The two outlet openings of the duct arranged on the two sides of the annular seal are completely closed by respective separate valves, which can be opened by means which is operated externally. The valve seats are formed in a sleeve of flexible material.

7 Claims, 1 Drawing Figure

PATENTED JAN 23 1973 3,712,429
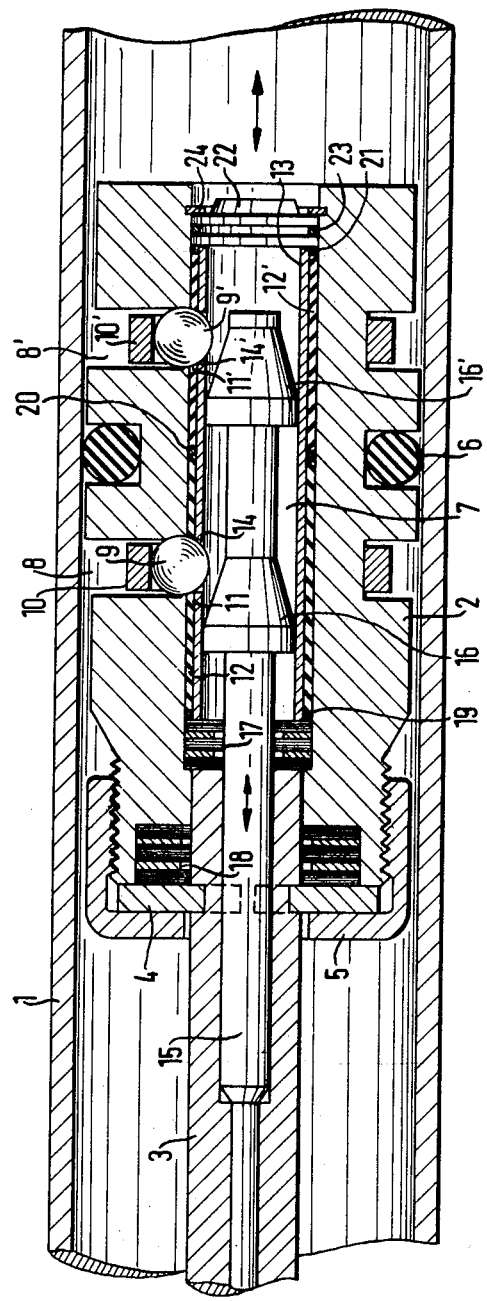

CYLINDER AND PISTON ARRANGEMENT

BACKGROUND OF INVENTION

1. Field to which invention relates

The present invention relates to piston and cylinder arrangements and more particularly to such arrangements which can be used for the stepless adjustment of seats, flaps etc. comprising at least one cylinder filled with a gas or liquid under pressure, or another pressure medium, and a piston rod which extends through a seal at one end of the cylinder to the outside and is provided with a piston which can slide axially in the cylinder. The piston is provided with a seal engaging the cylinder bore and is provided with a bypass duct extending from one side of the piston seal to the other. The duct has outlet openings connected with the interior space of the cylinder and having sealing seats arranged on both sides of the piston seal. Valve parts are arranged to cooperate with the sealing seats of both outlet openings. The valve parts can more particularly be spring-loaded valve bodies which are pressed in an inward direction and can be actuated by means of an externally operated part, more particularly an axially sliding or rotating control rod.

2. The Prior Art

The prior U.S. patent application Ser. No. 777,667, now U.S. Pat. No. 3,563,349 (below referred to as "the prior patent specification") describes a piston and cylinder arrangement which can be locked of the above type. Such a cylinder and piston arrangement offers the advantage over known constructions that the locking parts and valve parts are pressed against their sealing seat surfaces in the locked condition both on pulling and on pushing forces occurring. The pressure against the seats is always in the same direction. As a result undesired vibrations of the locking parts in the sealing surfaces can be avoided in the case of changes in load as mentioned above and wear can be considerably reduced. Advantages are also offered as regards the sealing off of the control rod, since a change-over in the direction of the applied load is also avoided. There is, however, the disadvantage that when compressed gas is used as a pressure medium or fluid, a satisfactory and secure sealing and locking is no longer achieved by the spring-loaded valve parts, for they cooperate with non-resilient, for example metallic, seating and sealing surfaces in both exit openings in the piston respectively. One aim of the invention is to avoid this disadvantage and ensure satisfactory sealing and locking in the case of a gas filled device as well. Furthermore the production of the piston and cylinder arrangement is to be made more simple and less expensive, especially as regards the construction of the piston.

SUMMARY OF INVENTION

This invention includes the provision that the sealing faces consist of a resilient material such as hard rubber, plastics material or the like. Owing to the resilient or yielding properties of the sealing surfaces there is a satisfactory sealing and locking even in the case of a gaseous pressure medium. The blocking parts or valve parts consist preferably of a non-resilient material, for it has been found to be particularly appropriate to use a non-resilient material as part of the seal arrangement. On the other hand the valve parts or locking parts can be made of a resilient material, while the sealing surfaces are made of a non-resilient material, as is the case with the initially mentioned arrangement.

In accordance with a preferred embodiment of the invention each sealing surface is formed by an annular surface of a ring inserted into the respective outlet opening and made of resilient material. It can, however, be convenient to produce the piston of resilient material, the sealing surfaces being formed by annular seats of the two outlet openings.

In accordance with a preferred embodiment of the invention each sealing surface is constituted by a passage opening arranged in at least one sleeve or in a flexible tube of resilient material, which is aligned with the associated outlet opening of the bypass channel. In this respect it is advantageous if the aligned outlet passage openings have a circular cross-section whose diameter is less than that of the exit opening, more especially only slightly less than it.

In accordance with another preferred embodiment the sleeve of resilient material abuts on the one hand against an inner wall of the bypassing duct and on the other hand against an outer wall of a support sleeve of metal or another non-resilient workpiece, two passage openings being arranged in the support sleeve, which are aligned with the two passage openings of the sleeve of non-resilient material and have approximately the same diameter.

A simplification of manufacture and a lesser cost of the arrangement can be obtained if the piston is in the form of a tubular molding, more particularly an injection molding, whose continuous inner space forms part of the bypass duct while its two ends are closed and sealed off from the rest of the interior of the cylinder.

In order to achieve a satisfactory sealing and secure locking action it is convenient to seal off the support sleeve from the interior space of the bypass duct by means of seals so that when two sleeves of resilient material with one respective passage opening are provided, a further seal can be provided between the two sleeves.

THE VIEW OF THE DRAWING

Further features and details of the invention will be gathered from the following description of a preferred embodiment, which is shown in the accompanying single FIGURE of drawing in partial longitudinal section.

DESCRIPTION OF PREFERRED EMBODIMENT

A piston 2 is arranged for axial sliding movement in a cylinder 1 filled with a pressure medium or fluid (liquid under pressure and gas under pressure, or gas under pressure alone). The piston 2 is connected with a piston rod 3, which extends through a seal at one end of the cylinder to the outside, for instance in accordance with the prior patent specification and is not shown in the accompanying drawing for the sake of simplicity. Also the end of the cylinder 1 opposite to the piston rod outlet end is not shown in the drawing since it can be constructed and sealed off in any suitable manner known to those in the art. When the pressure medium consists partially of liquid under pressure and partially of gas under pressure it is to be recommended to arrange an axially shifting seal between the pressure gas filling and the pressure liquid filling in the form of a disc, as will be known to those in the art.

The piston rod 3 is connected with the piston 2 by a two-part holding means 4 and an open cap nut 5. The holding means 4 fits into an annular groove in the piston rod 3 and is drawn firmly by the nut 5 against the end, shown at the left hand end in the drawing, of the piston 2.

The piston 2 is provided with a conventional seal, preferably an O-ring 6, bearing against the inner wall or bore of the cylinder 1. The main part of the piston 2 is a tubular or hollow-cylindrical molding, more particularly an injection molding, part of whose interior space forms a bypass duct 7, which ends in two outlet openings 8 and 8', arranged on both sides of the O-ring 6 so that the O-ring 6 is bypassed by the duct 7. In each of the two outlet openings 8, 8' a blocking part, for example a valve ball 9, 9' is arranged which blocks the passage cross-section of the respective outlet opening and is acted upon by means of a spring ring 10, 10'. The two valve balls 9, 9' are pressed by means of the associated spring rings 10, 10' against the seating or sealing surfaces in their closed position, which are formed by passage openings 11, 11', which are provided in two sleeves 12, 12' of resilient material. The tubular flexible sleeves 12, 12' are drawn on a support sleeve 13, possibly with a slight tensioning effect, lie firmly against the inner wall of the bypass duct 7 and on the other hand against the outer wall of the support sleeve 13. In the support sleeve 13 are two passage openings 14, 14' which are aligned with openings 11, 11' and the outlet openings 8, 8'. It is convenient if the passage openings 11, 11' and 14, 14' have the same diameter but are slightly smaller in diameter than the outlet openings 8, 8'. Support sleeve 13 is made of non-resilient or non-yielding material.

For actuating the valve balls 9, 9' and for unlocking and locking an axially moving control rod 15 is provided concentric in relation to the cylinder 1. The control rod 15 has one end passing out of the cylinder 1 though a seal which can be of a known type and is therefore not shown in the drawing. It is convenient to provide a known spring arrangement adjacent to the projecting end of the control rod 15 so that the spring urges the control rod 15 into the position shown in the drawing, in which the piston and cylinder arrangement is locked.

The end, opposite to the projecting control rod end, of the control rod 15 lies within the bypass duct 7 and is provided with two annular collars 16, 16' which cooperate with the valve balls 9, 9' for displacing them into the lifted open position. Instead of the axial displacement of the control rod 15 it is also possible to provide a rotatable arrangement of the rod in accordance with U.S. Pat. No. 3,563,349.

Near its end shown as the left hand end in the drawing the duct 7 is sealed off by two sealing stacks 17 and 18. The sealing stack 17 provides a sealing action against the control rod 15, while the sealing stack 18 cooperates with the piston rod 3 in providing a sealing action.

For further sealing three O-rings 19, 20 and 21 are provided on the support sleeve 13. As regards the position of the O-rings 19 to 21 reference is made to the accompanying drawing.

The end of the piston 3 shown as the right hand end in the drawing is closed by a solid plug 22 which is provided with a further O-ring 23 between it and the piston 2 to provide a sealing action and is held axially by a C-ring 24.

As can be readily seen from the above, the above-mentioned piston and cylinder arrangement is adapted to meet the above-mentioned requirements. Apart from the initially mentioned advantages there is also the further advantage that the arrangement in accordance with the invention can be very simply installed and assembled.

A preferred field of application for the piston and cylinder arrangement in accordance with the invention is the stepless adjustment of table flaps and chairs, both as regards the arm rests and seat part, more particularly in the case of motor vehicle seats Generally the piston and cylinder arrangement in accordance with the invention can also be used for any desires stepless adjustment and locking of flaps and other moving parts. Furthermore it is possible to use the device in accordance with the invention as a pneumatic spring which can be locked in position, the control being in this case so arranged and constructed that the locking parts or valves are always kept in the open position by being pressed against the spring rings so that the pressure medium can flow through the openings via the bypass leading past the ring 6 from one side of the piston to the other. If necessary the control rod can then be displaced for locking the arrangement. As can readily be seen the piston can be locked against axial displacement or can be arranged to be axially displaceable in accordance with the setting of the valves in the closed or open position, since in one case flow of the pressure medium is possible from one piston side to the other and in other case it is prevented.

I claim

1. A piston and cylinder device for the stepless adjustment of relatively movable parts and for locking them in any desired position, comprising a cylinder containing at least one pressurized fluid; a piston rod, mounted axially displaceably within said cylinder and connected to a piston having an annular seal bearing against the inner wall of said cylinder, the piston having at least one continuous connecting channel bypassing said annular seal including a plurality of outlet orifices; blocking means for said channel comprising a plurality of valve means each having an elastic spring element to urge it from the outside against the seat of its associated outlet orifice, each said seat being made of a flexible and elastic material formed by an annular surface surrounding a passage opening in a sleeve of flexible and elastic material which is aligned with the outlet orifice, so that said outlet orifices of said connecting channel are completely closed on both sides of said annular seal; and means for opening said blocking means and the flow cross-section of said outlet orifices.

2. A piston and cylinder device in accordance with claim 1 in which the outlet orifice and passage openings have a circular cross-section with the diameter of the passage openings being somewhat less than that of the associated outlet orifices.

3. A piston and cylinder device in accordance with claim 1 including a support sleeve of a non-resilient material, which lies against the interior of the sleeve of flexible and elastic material and supports the latter, the support sleeve having passage openings which are aligned with the passage openings in the sleeve of flexible and elastic material and have approximately the same diameter.

4. A piston and cylinder device in accordance with claim 3 comprising sealing means between the support sleeve and the wall of the connecting channel.

5. A piston and cylinder device in accordance with claim 1 in which the piston consists of a substantially hollow cylindrical or tubular molding whose interior space forms part of the connecting channel, the interior space of the piston being closed off and sealed off at both ends by seal means.

6. A piston and cylinder device in accordance with claim 1 in which the fluid is a gas.

7. A piston and cylinder device in accordance with claim 1 in which the fluid comprises a gas and a liquid.

* * * * *